(12) United States Patent
Lo et al.

(10) Patent No.: US 6,725,104 B2
(45) Date of Patent: Apr. 20, 2004

(54) METHOD AND APPARATUS FOR E-MAIL BASED COMMUNICATION WITH AUTOMATED FACILITIES AND DEVICES

(75) Inventors: George Lo, Plainsboro, NJ (US); Ronald Lange, Fürth (DE); Jürgen Schmoll, Markt Berolzheim (DE)

(73) Assignee: Siemens Aktiengesellschaft, Munich (DE)

(*) Notice: Subject to any disclaimer, the term of this patent is extended or adjusted under 35 U.S.C. 154(b) by 234 days.

(21) Appl. No.: 09/957,884

(22) Filed: Sep. 21, 2001

(65) Prior Publication Data

US 2003/0060900 A1 Mar. 27, 2003

(51) Int. Cl.$^7$ .............................................. G05B 19/18
(52) U.S. Cl. ............................ 700/65; 700/19; 700/20; 700/66; 700/17; 700/83; 709/205; 709/217; 709/220; 709/224
(58) Field of Search ............................. 700/65–66, 18, 700/17, 9, 19, 20, 28–31, 38–49, 83, 86, 87, 88, 89; 709/200, 205, 217, 220, 224, 226

(56) References Cited

U.S. PATENT DOCUMENTS

| | | | | |
|---|---|---|---|---|
| 5,432,711 A | * | 7/1995 | Jackson et al. | 700/2 |
| 5,860,068 A | * | 1/1999 | Cook | 705/26 |
| 5,930,768 A | * | 7/1999 | Hooban | 705/27 |
| 6,061,603 A | * | 5/2000 | Papadopoulos et al. | 700/83 |
| 6,360,252 B1 | * | 3/2002 | Rudy et al. | 709/206 |
| 6,499,114 B1 | * | 12/2002 | Almstead et al. | 714/25 |
| 6,587,884 B1 | * | 7/2003 | Papadopoulos et al. | 709/230 |
| 2003/0144746 A1 | * | 7/2003 | Hsiung et al. | 700/28 |

FOREIGN PATENT DOCUMENTS

JP 2002133063 A * 10/2000 ........... G06F/17/60

* cited by examiner

Primary Examiner—Ramesh Patel
(74) Attorney, Agent, or Firm—Baker Botts L.L.P.

(57) ABSTRACT

A method and system for communicating and controlling remotely devices in an automated facility exchanges electronic messages ("E-mails") between a server that controls the devices and an operator having a client device that has E-mail capabilities. An automation controller overseeing devices and stations within the facility is configured to send and receive over a network, such as the Internet, E-mail messages containing instructions and information. Accordingly, an operator may be alerted to alarm information, fault codes, and other operational parameters via E-mail, and after correcting the fault code or other problem, the operator may send an E-mail message to the automation controller that the situation has been corrected. The operator may also send and receive other information to and from the devices within the facility. Thus, not only human-to-machine and machine-to-human E-mail communication is facilitated, but also machine-to-machine communications via E-mail.

36 Claims, 7 Drawing Sheets

METHOD AND APPARATUS FOR E-MAIL BASED COMMUNICATION WITH AUTOMATED FACILITIES AND DEVICES

FIELD OF THE INVENTION

The present invention relates generally to the field of industrial automation, and in particular relates to methods and systems that enables E-mail communications between an operator and automated stations, devices, and automation controllers within a production facility or industrial plant.

BACKGROUND OF THE INVENTION

Advances in computer technologies have enabled industrial plants to become more automated. Through the use of automation controllers, such as Human Machine Interfaces ("HMI"), Supervisory Control and Data Acquisition Systems ("SCADA"), Programmable Logic Controllers ("PLCs"), and interactive field devices that communicate with automation controllers, many processes in an industrial plant can be automated and require little human attention. Notwithstanding these great advances in automation, most manufacturing processes still require some human intervention. For example, automatic feeders occasionally get jammed, valves sometimes stick in an open or closed position, measuring devices often need to be calibrated, etc. Even when things are operating properly, there is often a need for an operator to check (or reset) the operating parameters of a particular piece of equipment or station. In short, human intervention is often needed even in the most sophisticated automated factories.

Most automated applications employ some means to notify a human operator that some part of the assembly or production line is in need of human attention. Flashing lights and horns are the most common means for drawing an operator's attention to an occurring fault. Specific alarm information is typically displayed on some sort of human-machine-interface ("HMI"), such as a computer monitor or scoreboard apparatus. After an operator responds to the alarm and fixes the fault, the operator must then access an HMI to clear the fault from the system and reset the alarm. Moreover, operators must routinely check and access the HMI to monitor and change normal operating parameters.

Although flashing lights and horns are an effective way to draw attention to an occurring fault, they do not eliminate the need for the operator to check the HMI or scoreboard for a detailed description of the fault that is occurring. Moreover, the operator must have physical access to an input device associated with the HMI to clear the fault and reset the alarm. In most industrial plants, it is often a challenge to get from one location to another. Very often an operator must negotiate pipes, conveyors, and other obstacles to reach an HMI. Placing a large number of HMIs in a plant increases accessibility to the alarm and production information, but the number of HMIs that may be placed in a plant is usually limited by cost.

E-mail has rapidly become one of the most ubiquitous forms of communication in the office and business world, and is also rapidly becoming the same in the home and private spheres. Because of the popularity of E-mail as a communication medium, more and more mobile devices, such as pagers, Personal Digital Assistance ("PDAs"), cellphones and other appliances are beginning to provide E-mail capability. Most mobile devices can receive and display text messages, and the more sophisticated devices can acknowledge, compose, and send E-mail messages. Thus far, however, E-mail communications have been limited primarily to human—human communication.

Given the problems associated with the existing means for automated-facility-to-operator communication and operator-to-automated-facility communication, it would be advantageous to develop a system and method for using mobile devices and an E-mail protocol to facilitate human-to-machine and machine-to-human communications in an automated facility.

SUMMARY OF THE INVENTION

The present invention provides for a system for an automated facility to communicate with an operator and for an operator to communicate with an automated facility by exchanging E-mail messages. In an automated facility, an automation controller typically is in communication with one or more field devices that perform production or other functions. The controller sends information to the various field devices and receives information from these devices. In one embodiment, the controller comprises an Object linking and embedding (OLE) for Process Control (OPC) server that queries the field devices. According to the present invention, an application that operates with the controller allows the controller to interface with a network having capabilities for exchanging E-mails. The application facilitates the sending and receiving of E-mail messages between the controller and an E-mail appliance over the network.

The present invention thus facilitates a method of human-to-machine and machine-to-human communications and thus allows for remote control of automated factories. In one embodiment, a rule-based system may be used to remotely control an automated facility. A controller at the facility may query the field device and, based on the information obtained by the query, generate E-mail message. The E-mail message may be directed to one or more E-mail addresses. An E-mail enabled appliance may be used to read the message(s). A human operator or an intelligent device may compose a response to the E-mail message and the responsive message may be E-mailed to the controller.

The methods and system of the present invention enable for the operation of an automated facility in new and useful ways. By configuring an automation controller at a facility to send and receive Email messages relating to the operations of one or more devices under control of the controller, remote control and monitoring of the facility is possible. Communications between the automation controller and an E-mail appliance may be established over any network, including the Internet. Messages may be sent to the automation controller from an E-mail appliance over the Internet and vice-versa. The E-mail messages may contain instructions that cause a change in the operation of one of the devices under control of the controller when the message is received by the controller. In addition, the E-mail messages may instruct an operator to perform a physical operation in the plant and then acknowledge that the physical operation is complete.

DETAILED DESCRIPTION OF THE INVENTION

Figure 1:
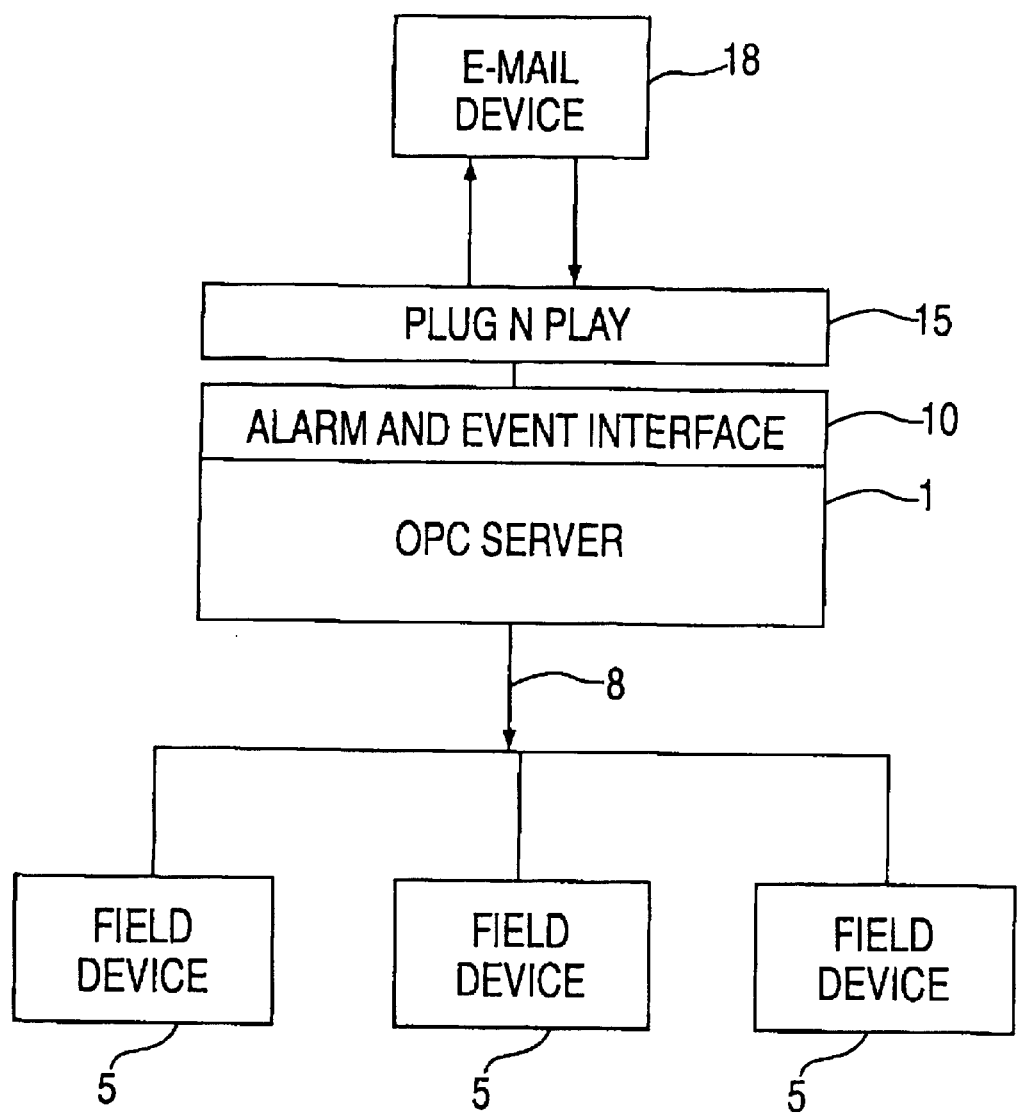
FIG. 1 is a block diagram showing the hardware and software used to implement one embodiment of the present invention.

Automation control controllers, such as HMIs, SCADAs, PLCs, and the field devices with which they interact, have made automated factories a reality. As is shown in FIG. 1, an OPC server 1, which is an application that is part of an automation controller, is interfaced with a plurality of automated field devices 5 and stations in a production facility. Typically, but not necessarily, the OPC server resides on an HMI or SCADA, which is normally a PC with basic data gathering functionality, and gathers data and alarm and event information from controllers and field devices. In some embodiments, the OPC server can be part of a PLC. In the embodiment of present invention that is shown in FIG. 1, the OPC server 1 and the field devices 5 bi-directionally communicate over a network 8. The OPC server 1 routinely queries the shop floor to determine if human intervention is needed at the various stations and devices 5. The network 8 on which the devices and server communicate may take the form of an Ethernet using standard TCP/IP protocols, or it may be a proprietary network, such as Profibus.® Preferably, but not necessarily, the OPC server 1 uses Object Linking & Embedding (OLE) software technology. Such software is available from Microsoft Corp., Redmond Wash. In addition to having an interface for communicating with the various devices, the OPC server preferably has an alarm & event interface 10. According to one embodiment of the present invention, a plug-and-play application 15 is added to the OPC server 1. This application 15 provides a means for sending alarm and other information from the OPC server 1 to an E-mail device 18, such as a pager, PDA, personal computer, cell phone, etc. The application also provides a means for sending operator-specific-information to a specific E-mail address.

Figure 2:
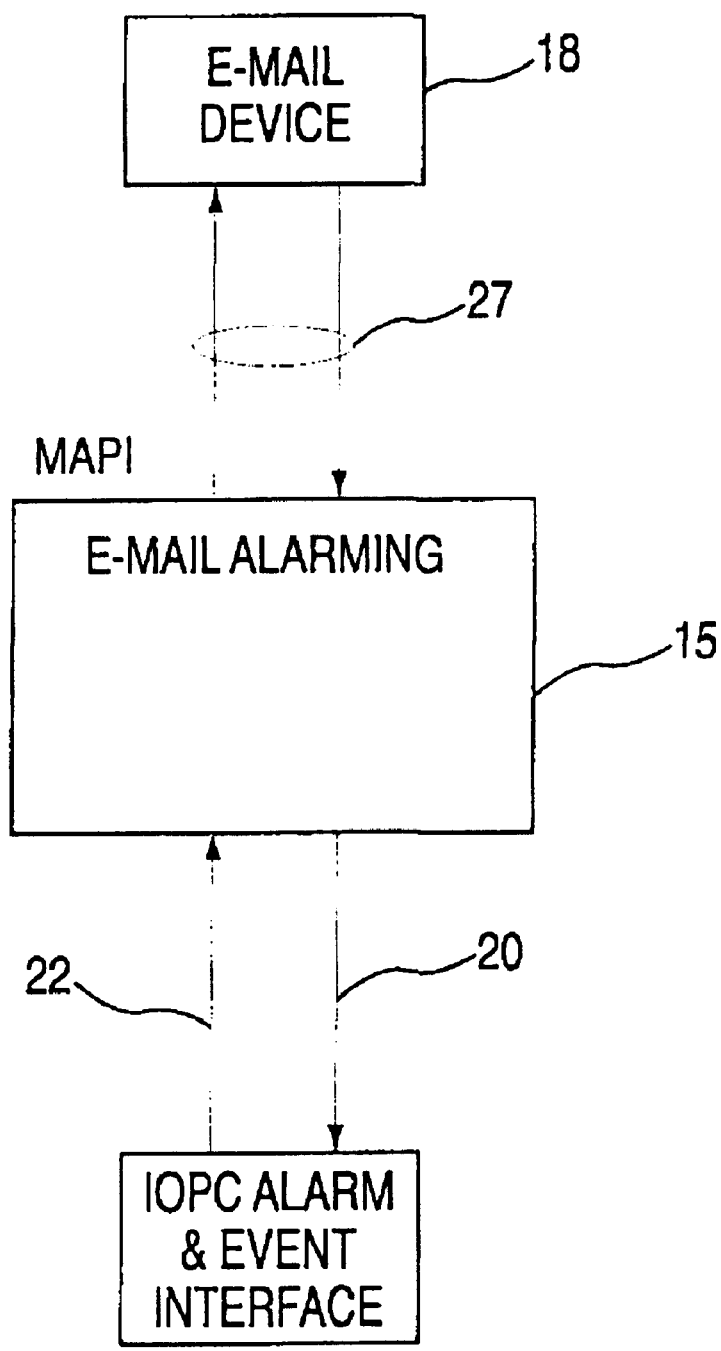
FIG. 2 illustrates one embodiment of the present invention for communicating between a central controller at an automation facility and an E-mail enabled device.

As is shown in FIG. 2, the application 15 interfaces with the OPC alarm & event interface 10, which may be built into the OPC server 1. This interface preferably provides a first communication path through which the application can receive alarm information, which may include status information, text messages, and class information, which may include category or severity information. The OPC alarm & event interface 10 also provides a second communication path 22 for subscribing to certain alarms, asking for alarm status and sending acknowledgments to the OPC server 1.

The application 15 may use standard protocols, such as MAPI or SMTP, and may have filtering and unpacking functions for providing specific additional information. Preferably, the application is a rule-based application. Typically, a rule-based system works off a configurable set of rules. For example, the application may provide for configuration by a system administrator or by others. The system administrator can thus regulate which operators may subscribe to which alarms and events. In some embodiments, individual operators may determine which events and which alarms they subscribe to.

When alarm or event information is transmitted from the OPC server 1, the application processes the information and sends it to the appropriate operator via a mail/pager connection 27. This connection 27 may utilize appropriate software for parsing and formatting of text. Typically, the information received from the OPC server 1 is configured as an E-mail message and that message is sent using standard E-mail protocols to an email ready device.

An operator subscribing to the E-mail message views the message on a E-mail ready device 18. In some cases, the operator may be required to perform a physical function, such as clear a jam, load labels, etc. After the operator performs the required task, the operator may send a message back to the OPC server 1 that the problem has been corrected. In one embodiment, the operator sends an E-mail message via the E-mail device 18. The message is transmitted via E-mail to the application where it is processed and formatted so that it may be interpreted by the OPC server.

Figure 3:
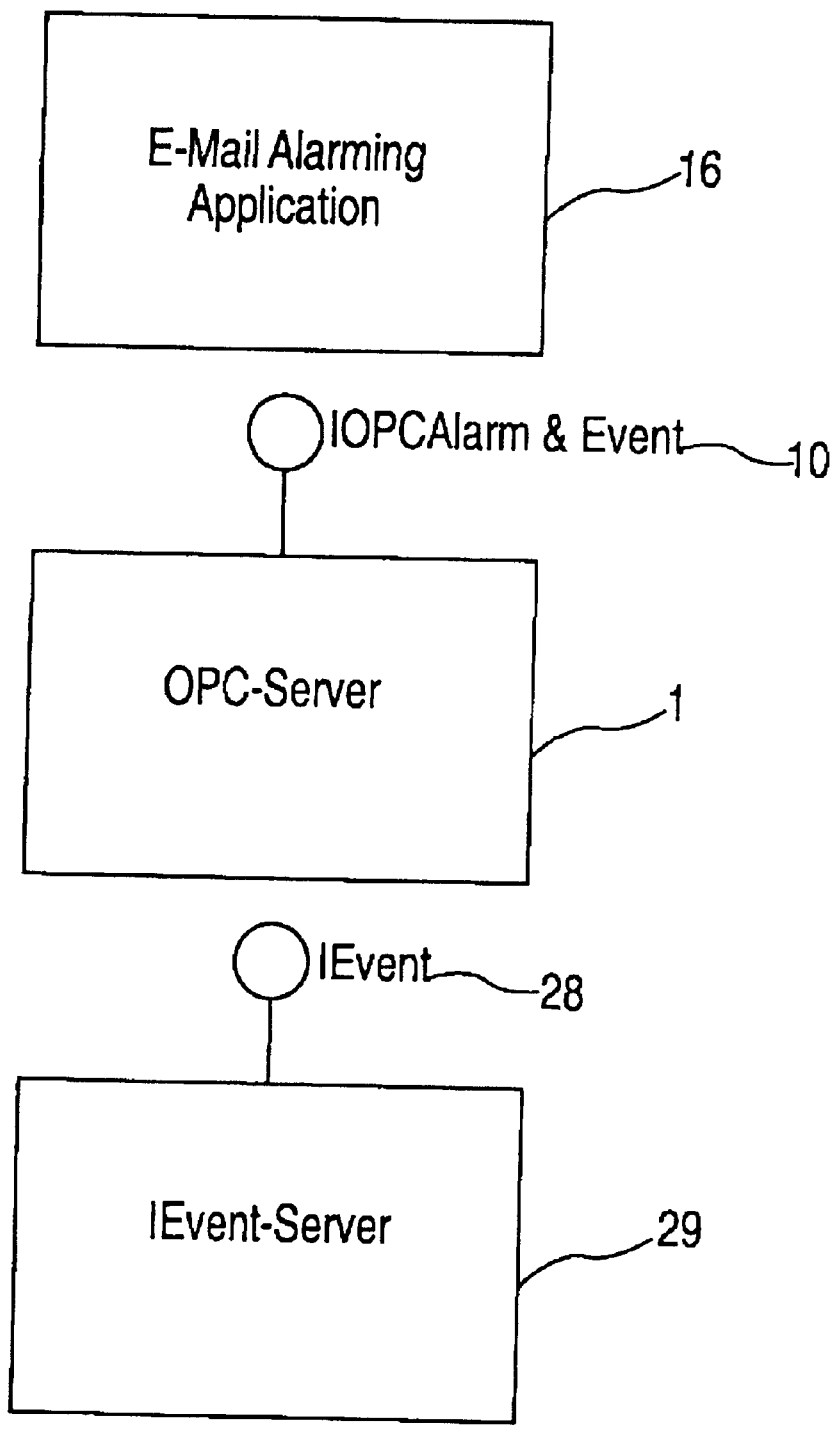
FIG. 3 illustrates an embodiment of the present invention that employs an IEvent server.

FIG. 3 depicts an alternative embodiment of the present invention. In this embodiment, the OPC server 1 has an Alarm and Event interface 10 for interfacing with an Email alarming application 16. In addition, the OPC server 1 is interfaced with (or contains as part of the same physical structure) an IEvent server 29. The IEvent interface 28 refers generally to a controller vendor's proprietary interfaces. Each controller manufacturer typically provides some similar proprietary interface and may use various names for these interfaces, which are not specified herein. The OPC Server and the IEvent server 29 communicate via an IEvent interface 28.

In some situations, the operator may be required to input various operating parameters. Through the use of the E-mail-ready device 18, the operator may compose an E-mail message containing the appropriate data for the task at hand. The E-mail containing data may then be sent to the application via standard E-mail procedures. The application will then extract the appropriate data, formats it, and send it to the OPC server 1. The OPC server 1 then processes the information and, if applicable, sends it to the appropriate field device 5.

In one embodiment, the present invention provides a method for remote monitoring and control of various components and stations in an automated industrial plant by utilizing bi-directional text-based communications between a centralized plant control means, such as the OPC server and one or more E-mail appliances. The present invention makes possible both guided remote monitoring and remote control with minimal system resources. In one embodiment, an automation control device for controlling various production stations, which may comprise one or more field devices, and an E-mail appliance, which is capable of sending and receiving emails, are provided, along with simple transmitting and receiving devices, which are capable of transmitting and receiving electronic text-based messages. This makes it possible to send monitoring messages, with data about certain operating states of a machine, for example, from the automation control device. Similarly, it is also possible to send control instructions and instructions for delivering a monitoring message in the reverse direction from the E-mail appliance to the automation control device, which may in turn be interfaced with the field device. The bi-directional capability made possible by these technical prerequisites thus provides for user-friendly and very flexible monitoring and control, respectively, of the control means and the field devices interfaced with it.

Since the data required for the monitoring and/or control are sent out by means of electronic text-based messages, such as E-mails, no separate hardware needs to be provided, since corresponding data lines in most cases already exist. Similarly, in most cases, it is not required to use or procure separately developed software, since the programs required for sending out or receiving electronic text-based messages have become freely available. The present invention may use existing software in two ways: both the security standard and the transport standard of the electronic text-based messaging system can be used directly. All standard security protocols can be used. It is thus conceivable to refrain from taking precautions, for reasons of simplicity, and to keep the messages sent out readable by anybody. In more sensitive areas, however, it will become necessary to encrypt the data before they are sent out and/or to provide them with a signature which allows identification of the sender (e.g. VeriSign®). Thus, one method according to the invention provides an inexpensive monitoring and control system with robust capabilities.

It is advantageously possible to configure the automation controllers that oversee operations of one or more field devices to use SMTP (Simple Mail Transfer Protocol) or POP3 (Post Office Protocol) transmission protocols. The data required for the monitoring and/or control can thus be sent out by E-mail in one of the SMTP or POP3 transmission protocols. By using standard E-mail protocols, the E-mail messages containing control and monitoring information may be sent over a variety of different wired and wireless networks to standard E-mail appliances, including but not limited to the Internet. This enables remote control and monitoring of an automated facility from any location where E-mails may be sent and retrieved. Thus, an operator can, from virtually anywhere, monitor and control an automated facility.

In addition to using standard E-mail protocols, the present invention may also employ tunneling procedures, which allow other protocols to be packaged within an E-mail. Tunneling is a method by which a different means of transport is used for a protocol. For example, a Siemens® PLC program is downloaded to a Siemens® PLC from a PC connected to the PLC by a Siemens® MPI cable using the Siemens® MPI protocol. It is possible for a remote PC to package the PLC program in an E-mail, send the E-mail to a second PC, which has an MPI connection to the PLC. This is one example of tunneling MPI over E-mail.

With respect to the formatting and coding of the data sent out, several possibilities exist. In one embodiment, the data required for the monitoring and/or control are sent out in a human readable format. This makes it possible for monitoring and/or control personnel to operate the remotely controlled or monitored devices by means of the bi-directional E-mail in such a manner as if it were located directly on an operating terminal of the automation control device. The monitoring person inputs the same required instructions and interrogations, which he would have had to input himself via an operating console at the automation control device in the prior art, into a remote universal terminal, such as a wireless E-mail appliance.

The wireless E-mail appliance may, in some embodiments, have a voice recognition device and the data to be sent out by it to the automation control device can be input orally into the voice recognition device. This provides for particularly easy operation, especially also via mobile telephones.

In another embodiment, however, the data can be sent out in a machine-readable protocol. In a completely automated environment, an E-mail device, such as a computer, might receive messages from an automation control device at a first factory and in response to these messages start operations at a second factory location. For example, an automation controller at a first wastewater treatment facility might, in response to an overload situation, send a message to an automation controller at a second wastewater treatment plant to put the second plant on line. It is thus conceivable that the treatment process is started in a second plant from the automation controller of the first plant. When capacity of a first plant is fully used, this operating state may be reported to the automated controller at the second facility via an E-mail.

EXAMPLES

In the text that follows, the invention will be described with reference to an embodiment and with five attached FIGS. 4–8. The examples set forth herein are exemplary and illustrative and are by no means exhaustive. The invention disclosed herein may be embodied in forms too numerous to list here.

Example 1

Figure 4:
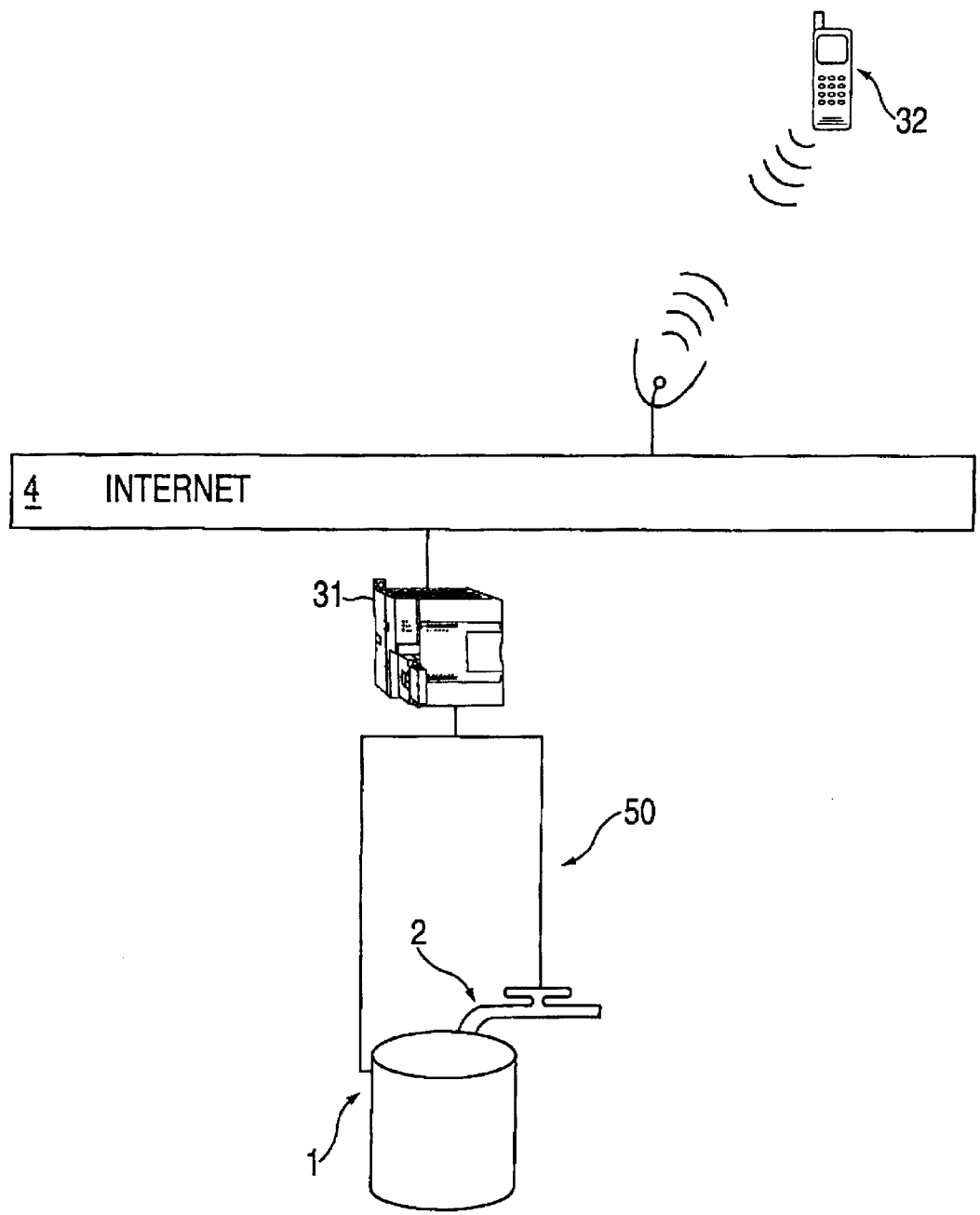
FIG. 4 illustrates components for an automated wastewater treatment plant that together exemplify one embodiment of the present invention.

The system of FIG. 4 comprises devices 1 and 2; 1 is a settling basin, 2 designates the inlet tap to the basin. A commercially available automation controller 31 controls the operations of a wastewater treatment plant. An operator is provided with an E-mail appliance, such as a mobile phone, 32. The programmable controller 31 and the mobile phone 32 are, in this example, connected to the Internet, which acts as a data transmission means 4. Both the automation controller 31, and the E-mail appliance 32 in each case have transmitting and receiving capabilities. The devices 1 and 2 are interfaced with the controller 31 using standard networking means 50, such as an Ethernet, Profibus.® E-mail messages can be sent from the controller 31 to the mobile telephone 32 and from the mobile telephone 31 to the controller 31. The controller 31 can then pass these messages via the local network 50 to devices 1 and 2. Moreover, devices 1 and 2 may send messages to the controller 31, which in turn sends E-mail message over the network 4 to the mobile phone 32.

Example 2

Figure 5:
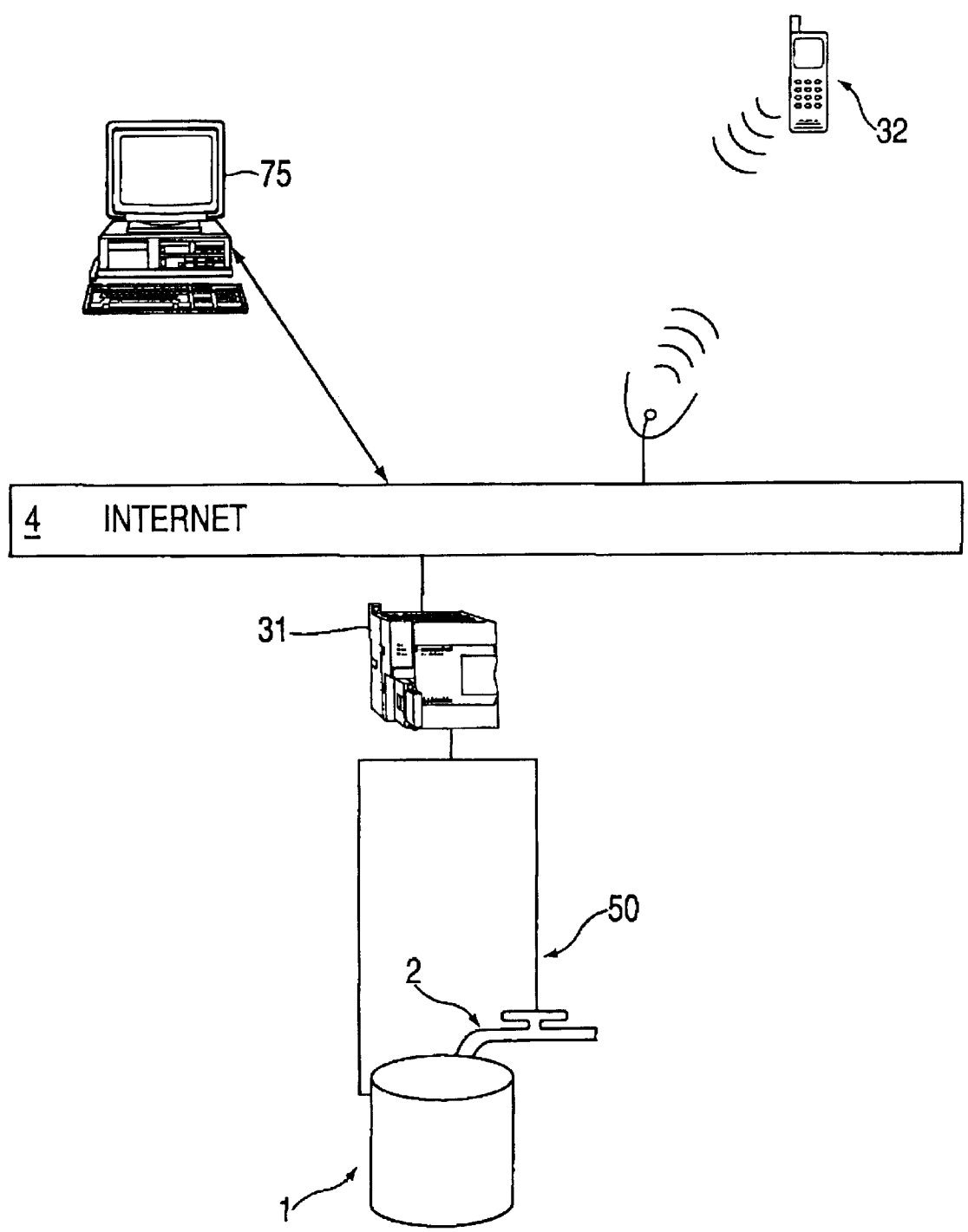
FIG. 5 is an alternative embodiment of the exemplary automated wastewater treatment plant employing the present invention.

The present invention may also be embodied in systems where the E-mail messages are sent from a central plant controller to an automation computer over the Internet and the automation computer may respond to these E-mail messages and send reply messages to the controller. For example, as is shown in FIG. 5 the wastewater treatment plant of Example 1, the controller 31 is interfaced with the settling basin 1 and the inlet tap 2 via a local area network 50, such as for example and without limitation a Profibus® or Ethernet. The devices 1 and 2 communicate with the controller 31 over the Profibus.® The controller 31, in response to communications from the devices 1 and 2 sends an E-mail to an automation computer 75 over a network 4, such as the Internet. The automation computer 75 then responds to the E-mail message by sending a reply E-mail message to the controller 31. If human intervention is needed, either the controller 31 or the automation computer 75 may send an E-mail message over the network 4 to an operator's E-mail appliance such as the mobile phone 32.

Figure 6:
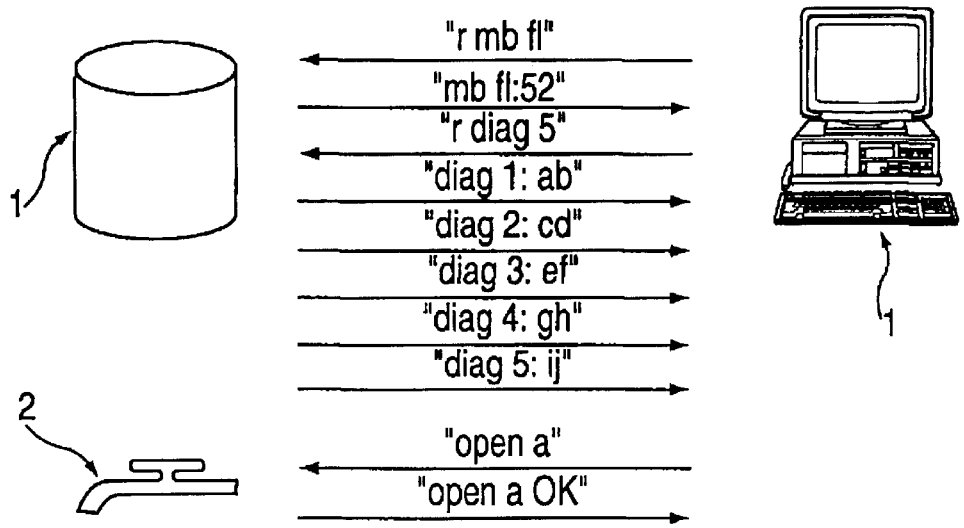
FIG. 6 illustrate exemplary E-mail messages sent to and from an automated facility according to the present invention

Communications between the automation computer 75 and the controller 31 take the form of text based E-mail messages. The sequence of E-mails transmitted between the devices, shown in FIG. 6, represents a conceivable response to a scenario in which the inlet tap 2 is opened as soon as the settling basin 1 has become empty in order to ensure further operation of the basin. The automation computer 75 interrogates this state, for example, by sending an E-mail with the content "r mb 0" (read memory byte 0) to the controller 31, where memory byte 0 contains the reading of the sensor on the basin 1. The controller 31 in turn creates an E-mail message with the content "mb 0: 52" (value of memory byte 0 is 52) and sends it to the automation computer 75. This sequence of interrogation continues, for example, every 10 seconds until the value of the memory byte 0 indicates an operating state in which the settling basin 1 is emptied. At which point in time, the automation computer 75 instructs the controller 31 to open the inlet tap 2 by sending an E-mail with the content "Open a"to the controller, where "a" is the symbolic address of the inlet tap 2.

In some embodiments, the system may alert a human operator that a fault on the local network 50 has occurred. The operator may send an E-mail from the automation computer 75 containing the instruction "r diag 5" (read last 5 messages from the diagnostic buffer) to the controller 31. The controller response by sending back an E-mail containing the last 5 entries in its diagnostic buffer.

Example 3

Figure 7:
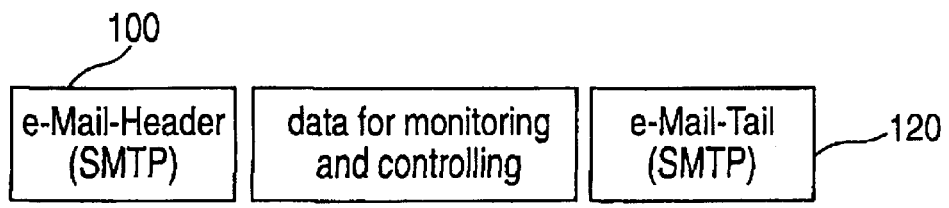
FIG. 7 illustrates an exemplary E-mail format for use with the present invention.

FIG. 7 shows the typical structure of one of the electronic mails. The data needed for monitoring and control are enclosed by an E-mail header 100 and an E-mail tail 120. Header 100 and tail 120 have the effect, on the one hand, that transport via the Internet becomes possible and the reception at the respective programmable control device is ensured at all. At the same time, they ensure the standard of security usual for electronic mail: to prevent unauthorized access to the programmable control devices, the data are coded before the transmission and provided with a signature which allows conclusions to be drawn about whether the received data have been actually sent in each case by the control device or by the programmable control device, respectively.

Example 4

Figure 8:
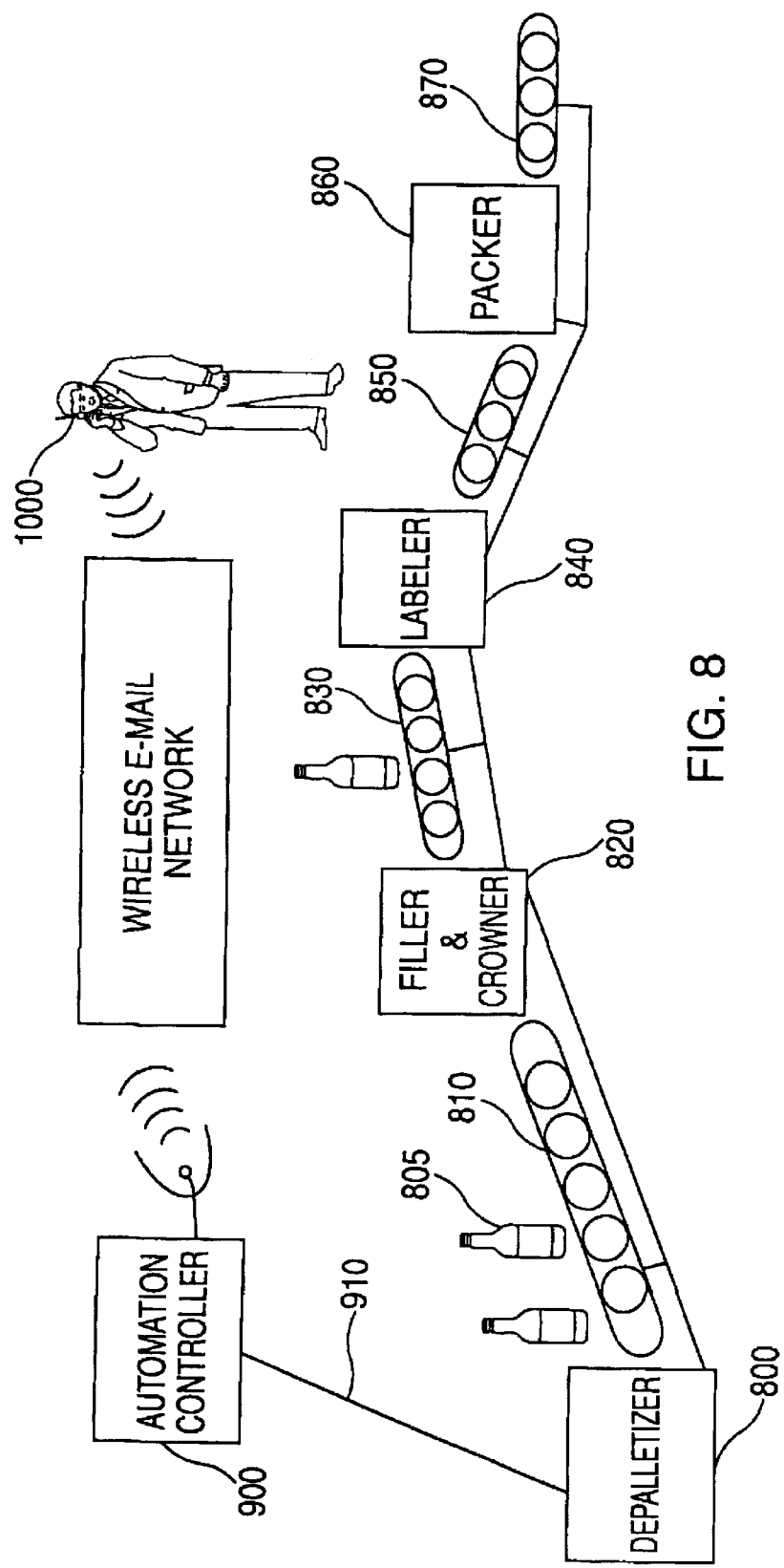
FIG. 8 illustrates a portion of a brewery employing an embodiment of the present invention.

FIG. 8 illustrates a packaging line in a brewery. A depalletizer 800 is the first station of a bottling line. Boxes containing empty bottles are removed from pallets on which they were delivered. The unpacked bottles 805 are then transported on a first conveyor 810 to a filler 820 where they are filled with beer and then crowned. The filled bottles are then transported on a second conveyor 830 to a labeler 840. After labels are placed on the bottle, they are transported on a third conveyor 850 to a packer 860. After being packed, the bottles are transported to a final station via a fourth conveyor 870 where they are palletized for shipment to customers.

The typical bottle line is highly automated and requires little manual intervention once a production is running. Typically, all stations are interfaced with an automation controller 900 via a network 910. However, there is much preparation that needs to be done before production can begin. Pallets of empty bottles with the correct size or color have to be delivered to the depalletizer. Bottle labelers have to be loaded with the correct labels. If there is a change to the bottle size from the previous production, certain machines will need to be retooled or readjusted.

Prior to the present invention, in order to better coordinate the production preparations, scoreboards comprising large text displays are mounted at vantage locations in addition to HMIs to show the status of the productions in progress and, more importantly, when the next production orders are scheduled to begin. With this information, the shop floor operator can then prepare the respective stations in time for the next production.

According to the present invention, each operator responsible for a station is provided with an E-mail appliance 1000, i.e., an apparatus capable of receiving (and in some case sending) emails. The information that, prior to the present invention, was displayed on scoreboards, may be sent to the E-mail appliances 1000 instead of or in addition to being displayed on scoreboards. Advantageously, the information sent to the E-mail appliances may be customized for each operator. By giving each operator a separate address, E-mail messages containing information pertaining to stations for which an operator is responsible can be customized so that the operator only receives information about those stations. Likewise, other operators will receive information about only their stations and can remotely control operating parameters, such as for example fill flow rate or conveyor speed, for these stations. Either the individual operators or a centralized administrator can control which E-mail messages each operator subscribes to.

Example 5

In the brewery described in Example 4, a method for immediately alerting operators of production halting faults must be implemented. For instance if the labeler were to run out of labels during a production run, in the prior art, flashing lights and horns would alert every operator in the plant that there were a problem. As a result, each operator needed to check the scoreboard and then respond accordingly. According to the present invention, alarm signals and faults that halt production, such as the labeler running out of labels, may be immediately directed to the operator in charge of the station where the fault is occurring. Not only does this eliminate the need for every operator to check a scoreboard when an alarm sounds, the operator who is responsible for correcting the fault is provided with immediate information relating to the fault and has at his or her immediate disposal a means of sending a response to the controller when he or she corrects the fault. For instance, the operator in charge of the labeler will receive an E-mail message to reload the labeler. The operator can proceed immediately to a label supply area to acquire new labels without first having to check a scoreboard to determine the reason for the fault. Moreover, after the operator loads new labels, he or she can then send a message from his or her E-mail appliance to the factory controller that the fault has been corrected and the alarm can be reset and production can continue. The operator need not negotiate obstacles, such as conveyors or pipes, to find a HMI. The operators E-mail device, which may be a portable wireless device, provides instant access to not only read a fault associated with an alarm, but to respond accordingly.

As described above, the present invention provides improved ways to control automated facilities. Because one embodiment of the present invention uses bi-directional E-mails to send and receive information to and from an operator, the present invention may be employed in a variety of automated environments, including those that contain firewalls or other security measures that limit access to the controller at the automated facility, typically firewalls and other security measures allow for the sending of E-mail to and from the system even when direct remote access to a system is prohibited. Of course, if security is a concern, the E-mail messages being sent to the facility can be encrypted or protected with other known measures.

As is apparent from the above description, the present invention is robust and may be embodied in a variety of forms. Advantageously, the present invention may, in some embodiments, use standard off-the-shelf software, such as MAPI controls and public paging service providers. Microsoft® DNA compliant architecture is well-suited for use with the present invention.

The present invention is also highly scaleable and may be configured to serve broad needs or scaled back to be component deployable by using software technology, such as an ActiveX® control available from Microsoft Corporation in Redmond Wash. ActiveX® control advantageously allows an application to be deployed as a component for embedding in another application. In some embodiments messages may be classified (e.g. Production status, alarms). While sub-classes may also be used they are not required by all embodiments. Preparation of messages and the integration with the underlying systems (e.g. PIM and alarming) or simulated environments may be done using a range of different programming techniques, including Visual Basic,® available from Microsoft Corporation, Redmond Wash. As discussed above the present invention also advantageously allows users to subscribe and un-subscribe to individual messages or classes of messages (e.g., current production status or currently outstanding alarms). In some embodiments the minimum elapsed time between E-mails is user-configurable and new information occurring within the elapsed time may be sent as a block in one E-mail.

Although many embodiments described herein involved the use of an OPC server, the present invention is well-suited for use in a variety of different environments, including both PLC systems, which typically employ closed architecture and standards, as well as in systems employing open architecture and standards. In general, a system built on closed or proprietary standard/architecture only allows the owner of that standard/architecture to build application for that system. While a system built on open standard allows anyone to build and expand the system.

The invention disclosed herein has broad and wide ranging applications. It may be embodied in numerous forms, including many forms not explicitly described herein, that are readily apparent to those skilled in the art.

What is claim is:

1. A system for establishing bi-directional communication between an operator and an automated facility, the system comprising: an automation controller for the facility, the controller in communication with at least one field device within the facility, the controller adapted for controlling at least one operation of each of the at least one field device; and an application for interfacing the controller with a network having electronic mail ("E-mail") exchanging capabilities, the application adapted for transforming control data into an E-mail message and sending said E-mail messages from the controller to the one or more E-mail addresses and for receiving E-mail messages sent to the controller and transforming said E-mail messages into control data.

2. The system of claim 1, wherein application is a plug-n-play application.

3. The system of claim 1, wherein the controller comprises an OPC server.

4. The system of claim 3, wherein the OPC server comprises an alarm & event interface, the alarm & event interface interfacing the OPC server with the application.

5. The system of claim 1, wherein the E-mail messages sent to and from the controller are text-based messages.

6. The system of claim 1, wherein the E-mail messages comprise alarm information.

7. The system of claim 1, wherein the application comprises a rule-based application.

8. The system of claim 1, wherein the automation controller is associated with an E-mail address for receiving E-mail messages.

9. The system of claim 1, wherein the automation controller comprises an HMI.

10. The system of claim 1, wherein the automation controller comprises a SCADA.

11. The system of claim 1, wherein the automation controller comprises a PLC with OPC server functionality and E-mail capability.

12. The system of claim 1, wherein the field device comprise an input/output device.

13. The system of claim 1, wherein the field device comprises an intelligent device.

14. The system of claim 1, wherein the field device comprises a PLC and wherein the PLC is connected to the automation controller via a serial connection.

15. The system of claim 1, wherein the field device comprises a PLC and wherein the PLC is connected to the automation controller via a network.

16. The system of claim 1, wherein the application is configured to employ tunneling procedures.

17. The system of claim 1, wherein the application is configured to tunnel a protocol with E-mail.

18. A rule-based method for remotely controlling the operations of devices in an automated facility comprising a field device interfaced with an automation controller that is configured to send and receive E-mail, the method comprising the steps of: querying the field device to obtain information about the field device with the automation controller; based on the information obtained from the query, generating an E-mail message; sending the E-mail message to an operator at an E-mail address that corresponds to the operator, and receiving the E-mail message from the controller on an E-mail device; and in response to the E-mail message from the controller, performing a physical operation at a facility before sending the response to the controller.

19. The method of claim 18, wherein the E-mail messages are text-based messages.

20. The method of claim 18, wherein the operator's E-mail address is an E-mail address for a human operator.

21. The method of claim 18, wherein the operator's E-mail address is an mail address for an intelligent device.

22. The method of claim 18, wherein the step of sending an E-mail message comprises sending the E-mail message over the Internet.

23. A method for enabling an operator to communicate with an automated facility comprising an automation controller in communication with a field device, the method comprising the steps of: receiving from the facility an E-mail containing information about the field device based on control data received from the field device; generating a response E-mail; and E-mailing the response E-mail to an E-mail address associated with the automation controller.

24. The method of claim 23 wherein the step of E-mailing the response E-mail comprises sending the E-mail over a public network to the E-mail address.

25. The method of claim 24, wherein the public network is the Internet.

26. The method of claim 23, wherein the step of E-mailing the response E-mail comprises sending the E-mail from a wireless E-mail device.

27. The method of claim 23, wherein the step of generating the response E-mail comprises speaking into a device.

28. The method of claim 23, further comprising tunneling a protocol with the response E-mail.

29. A method for remotely monitoring and controlling a portion of an automated facility comprising an automation controller and a plurality of field devices supervised by the controller and at least one operator for the facility, the method comprising the steps of: configuring the automation controller to send E-mail messages over a network to an E-mail address; and configuring the automation controller to receive E-mail messages from the operator.

30. The method of claim 29, further comprising the step of interfacing the automation controller with the Internet.

31. The method of claim 30, further comprising the step of configuring the controller to change an operating parameter of the field device in response to receiving an E-mail message from an operator.

32. The method of claim 31, further comprising the step of instructing an operator to perform a physical operation in response to receiving a predefined E-mail message.

33. The method of claim 30, wherein the wireless E-mail device is adapted for receiving and sending E-mail messages.

34. The method of claim 29, further comprising the step of providing the operator with a wireless E-mail device.

35. The method of claim 29, further comprising the step of configuring the controller to encrypt E-mail messages before sending them and decrypt E-mail messages received from the operator.

36. The method of claim 29, further comprising configuring the controller to accept a protocol tunneled with E-mail.

* * * * *